Nov. 30, 1965     P. A. MUELLER     3,220,741
ROTARY MECHANICAL SEAL
Filed Feb. 6, 1961     2 Sheets-Sheet 1

Inventor:
Peter A. Mueller
By Norman Gerlach
Attorney.

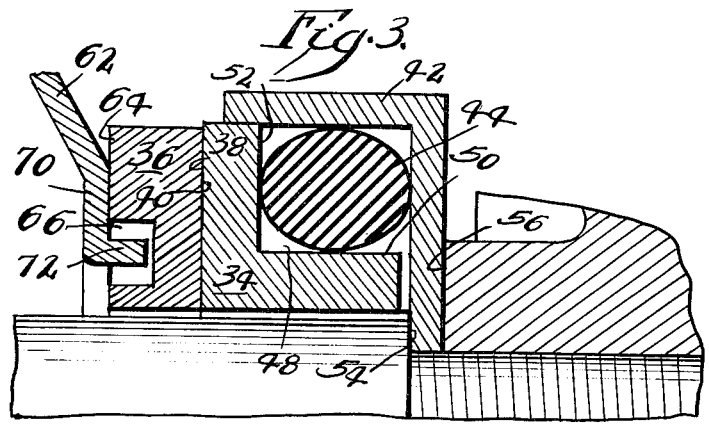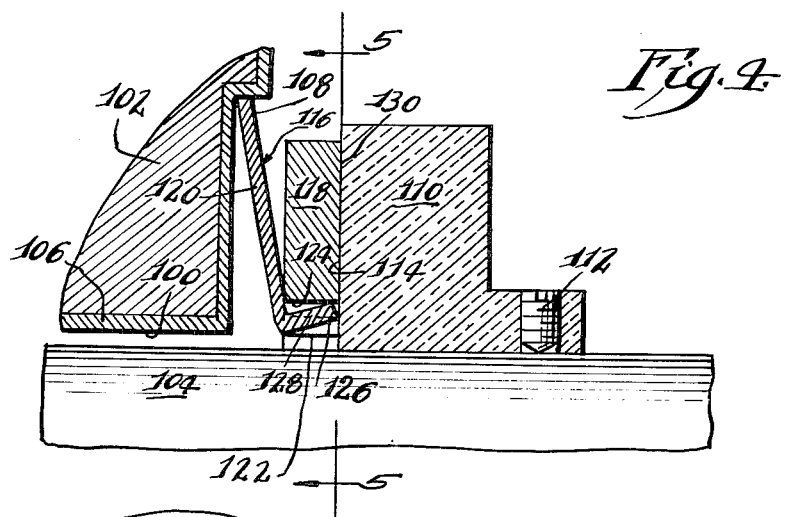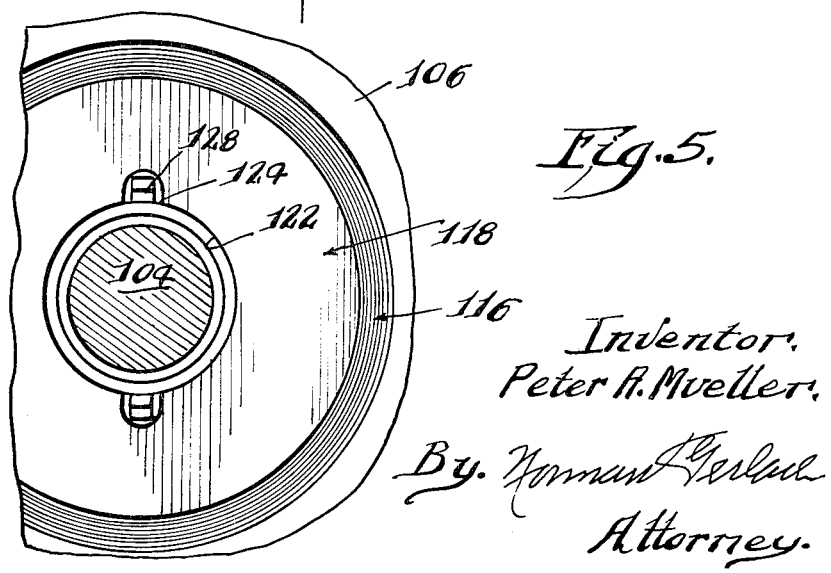

United States Patent Office 3,220,741
Patented Nov. 30, 1965

3,220,741
ROTARY MECHANICAL SEAL
Peter A. Mueller, Oak Park, Ill., assignor to Mueller Seal Company, a corporation of Delaware
Filed Feb. 6, 1961, Ser. No. 87,317
2 Claims. (Cl. 277—92)

The present invention relates generally to improvements in rotary mechanical seals of the type which effects a seal against the passage of fluid between relatively movable machine parts, as, for example, a shaft and a casing within which the shaft is rotatably mounted. More specifically, the invention relates to a mechanical seal in which the sealing effect between the relatively moving parts occurs at radially extending surfaces and wherein a so-called running seal is provided between the moving parts.

The running surfaces or faces of a rotary mechanical seal of the type briefly outlined above are usually provided on a pair of opposed sealing elements, one of which is generally known as the seal seat and the other of which is commonly termed the sealing washer. Usually, one of these elements is maintained stationary with the casing to which it is effectively sealed, while the other element is caused to rotate with the shaft to which it likewise is effectively sealed.

Sometimes the seat is press-fitted within the opening in the casing through which the shaft extends, but more often than not, the seat is carried on the shaft and rotates therewith while the washer, which has a running fit with the seat, forms a part of a washer assembly by means of which it is sealed to the wall of the opening and is thus maintained stationary except for its ability to shift axially to compensate for combined washer and seat wear. Such axial shifting seldom exceeds a few thousandths of an inch during the entire seal life. The present invention is concerned primarily with the provision in a mechanical seal of a novel form of washer assembly by means of which the washer proper is effectively sealed to the wall of an opening in a pump housing, a compressor housing, the wall of a liquid-containing tank or the like, and through which opening a rotary shaft extends.

A present-day washer assembly almost invariably comprises four principal functional parts, namely, a washer, a spring for urging the washer forwardly against the seat with the proper degree of pressure to exclude passage of fluid radially past the running seal faces but not with such extreme pressure as to shut out the necessary amount of fluid for lubrication and antisqueal purposes, a bellows of elastomeric material for sealing the washer to the wall of the pump or other housing, and a retainer, usually of brass, for maintaining the washer, spring and bellows in their operative positions. The retainer is adapted to be press-fitted into the shaft opening, or alternatively, into a recess in the pump housing surrounding the opening.

It is among the principal objects of the present invention, to provide, in a rotary mechanical seal, a novel washer assembly wherein the spring and bellows combination is eliminated and, in its stead, there is substituted a single metal element in the form of an imperforate resilient ring of frusto-conical design, this ring serving the dual function of yieldingly urging the washer forwardly against the seat and of sealing the washer to the cylindrical wall of the opening through which the rotating shaft extends.

A further object of the invention, in a modified form thereof, is to provide a novel washer assembly wherein the retainer, in addition to the spring bellows, is eliminated, thus resulting in a two-part assembly including only the ring and washer.

Yet another object of the invention is to provide a novel form of interlocking reaction means between the washer-supporting ring and the washer for preventing relative rotational movement between these parts.

A similar and related object is to provide novel alternative forms of interlocking reaction means between the washer-supporting ring and the washer for preventing rotational slipping movement of the washer relative to the ring.

The provision of a washer assembly which is capable of being manufactured and assembled at the factory by precision methods and, thereafter, shipped as a package-type unit for installation in the field without alteration is another important feature and object of the present invention.

The provision of an assembly as outlined above which is extremely simple in its construction and, therefore, may be manufactured at a low cost; one which is comprised of a minimum number of relatively moving parts and, therefore, is unlikely to get out of order; one which, in the main, may be manufactured from sheet metal by simple stamping operations, thereby further contributing toward economy of manufacture; one which is possessed of a relatively long seal life; and one which, otherwise, is well-adapted to perform the services required of it, are further desirable features which have been borne in mind in the production and development of the present invention.

Numerous other objects and advantages of the invention, not at this time enumerated, will become readily apparent as the following description ensues.

In the accompanying two sheets of drawings, one exemplary embodiment of the invention, representing the first form of the washer assembly as mentioned above, is shown as employing one specific type of interlocking drive means between the ring and washer, while another exemplary embodiment, representing the second form of washer assembly, employs a different interlocking drive means. It will be understood, however, that these drive means are interchangeable and either may be employed in place of the other in connection with either the two-piece or the three-piece form of the invention.

In these drawings:

FIG. 3 is an enlarged fragmentary detail view of a portion of the structure shown in FIG. 1;

FIG. 4 is a fragmentary quarter sectional view taken substantially centrally and vertically through a modified form of washer assembly, showing the same operatively installed in an agitator tank; and FIG. 5 is a sectional view taken substantially along the line 5—5 of FIG. 4.

Figure 1:
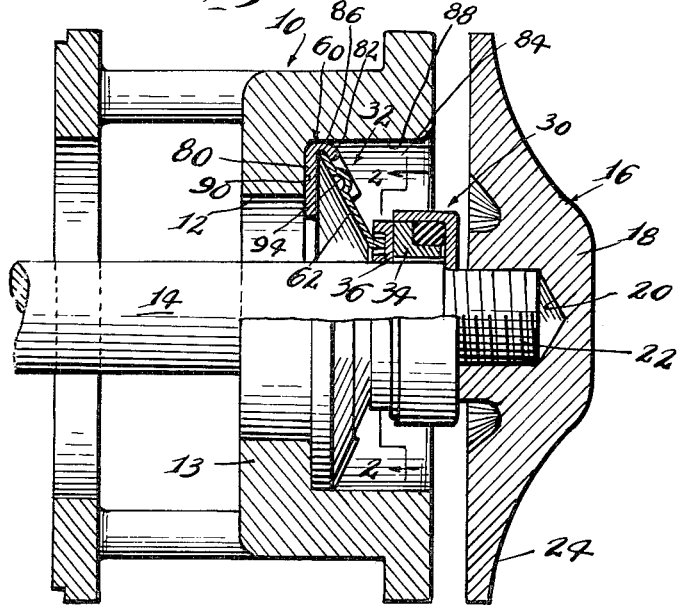
FIG. 1 is a fragmentary sectional view, partly in elevation, taken substantially centrally and longitudinally through a pump assembly showing one form of a rotary mechanical seal embodying the invention operatively installed therein.
Figure 2:
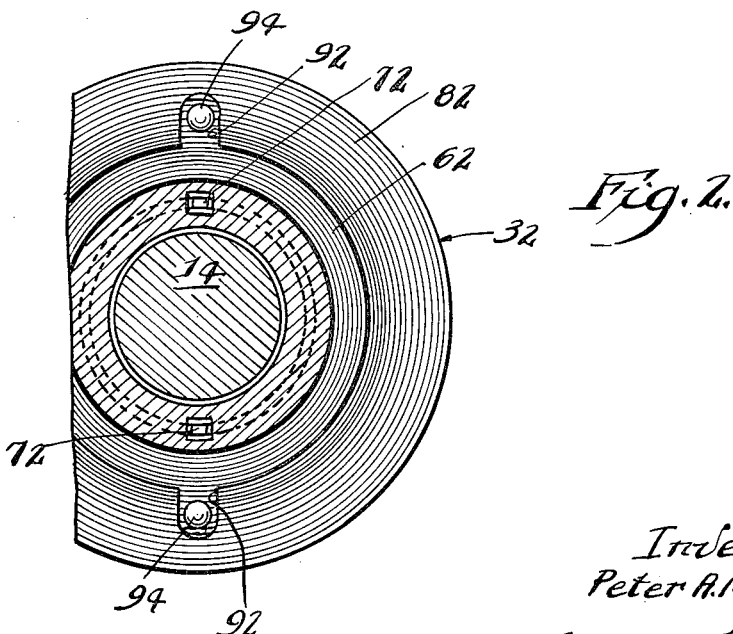
FIG. 2 is a sectional view taken substantially along the line 2—2 of FIG. 1.

Referring now to the drawings in detail, and in particular to FIGS. 1 to 3, inclusive, the structure selected for illustration in these views as a typical environment for the improved rotary mechanical seal of the present invention may be assumed to be a centrifugal, impeller-type, automotive water pump, including a housing 10 having a central opening 12 in one wall 13 thereof and through which opening the usual impeller drive shaft 14 extends. The impeller shaft 14 is rotatably mounted in suitable bearings (not shown) and carries at its outer end an impeller 16. The impeller 16 includes a central hub 18 having a threaded socket 20 threadedly received on a reduced end portion 22 of the shaft 14. A series of impeller blades 24 extend radially outwardly from the hub 18.

The washer assembly by means of which the opening 12 is sealed against passage of liquid therethrough comprises two principal parts, namely, a seat assembly 30 and a retainer, ring and washer assembly 32. The seat assembly 30 includes a seal seat proper 34 (hereinafter referred to simply as the seat), while the washer assembly 32 includes a washer proper 36 (hereinafter referred to as the washer). The seat and washer are provided with respective flat annular radial seal faces 38 and 40 which are designed for running contact with each other in the usual manner of operation of rotary mechanical seals of the general type disclosed herein.

The seat assembly 30 per se forms no part of the present invention except insofar as its cooperation with the washer assembly 32 is concerned and no claim is made herein to any novelty associated with the same. The present invention resides rather in the novel construction and arrangement of parts of the washer assembly 32 which will be described in detail presently.

The seat assembly 30, selected for illustration herein, involves in its general organization an outer, cylindrical, cup-shaped retainer 42 (FIG. 3), the previously-mentioned seat proper 34, and a resilient O-ring 44 of elastomeric material. The seat 34 is recessed as at 48 to accommodate the O-ring 44, and the seat and O-ring assembly are telescopically received within the cup-shaped retainer 42 in such a manner that the O-ring bears against the cylindrical wall 50 of the seat proper and its radial wall 52 of the retainer and serves to center the seat 34 within the retainer. The inner peripheral region of the radial wall 52 of the retainer 42 is clamped between the shoulder 54 which exists at the base of the threaded portion of the shaft 14 and the inner end face 56 of the impeller 16, thus constraining the entire seat assembly 30 to rotate bodily with the shaft 14. The seat assembly 30 just described is purely exemplary and other forms of seat assemblies offering a flat annular radial seat forming face, such as the face 38, may be substituted if desired.

Still referring to FIGS. 1 to 3, inclusive, the washer assembly which forms the subject matter of the present invention is comprised of three parts, namely, an outer retainer 60, the previously-mentioned washer 36, and an intermediate metallic backing ring 62 of frusto-conical configuration.

The washer 36 is in the form of a substantially flat ring which surrounds the shaft 14 and presents its running seal face 40 to the opposed seal face 38 of the seat 34. The rear face 64 of the washer 36 is provided with a pair of diametrically disposed sockets 66 therein, the purpose of which will be made clear presently. The washer 36 may be formed of any one of a number of materials which commonly are employed in the manufacture of seal washers. Among these are close-grained cast iron, brass, stainless steel, or a noncorrosive material, such as Teflon, or a ceramic material where the assembly 32 is to be employed in connection with the pumping of caustic liquids, acids, or the like. One material which has been found particularly useful in the manufacture of automotive seals is a synthetic thermosetting resin containing a powdered metal alloy of lead, antimony and tin. The two running seal faces 38 and 40 are lapped flat so as to prevent egress or ingress of fluid in either direction radially across these running faces. The material of the seat 34 is, in automotive pumps, usually cast iron, but other materials are in use, for example, ceramic materials where caustic fluids are undergoing pumping.

The washer 36 is adapted to be yieldingly pressed forwardly against the seat 34 by means of the previously mentioned ring 62. As shown in FIGS. 1 and 3, the rim region of the small base of the generally frusto-conical ring 62 is turned inwardly to proivde a flat wall or annulus 70 which bears against the rear face 64 of the washer. A pair of drive lugs or tongues 72 are struck forwardly from the annulus 70 and project into the diametrically disposed sockets 66 and thus prevent relative rotation between the washer 36 and ring 62 when the seal is installed. Although the entire washer assembly 32 is nonrotatable, the interlocking parts which are ordinarily provided between a washer and its retainer in conventional seals are commonly referred to as a driving connection, and where lugs are employed, they are generally known as drive lugs. The ring 62 is preferably in the form of a stamping and it may be formed of stainless steel as shown in the drawings, the ring is straight-sided.

The retainer 60 is in the form of a metal annulus, preferably a brass stamping. The annulus is generally V-shape in radial cross section and presents a rear radial wall 80 and a forwardly and inwardly inclined frusto-conical wall 82. As shown in FIG. 1, the retainer 60 is adapted to be pressed into a recess 84 so that the outer rim 86 thereof fits against the cylindrical wall 88 of the recess, while the radial wall 80 fits against the bottom wall 90 of the recess. As shown in FIG. 2, the inner peripheral rim of the frusto-conical wall 82 of the retainer 60 is notched as at 92 at diametrically disposed regions, and the metal of the ring is deformed as at 94 to provide a pair of small protuberances which project into the notches 92 and thus prevent relative rotation between the ring 62 and retainer 60. The rim or the large base of the frusto-conical ring 62 seats within the circular crotch which exists between the radial wall 80 and the frusto-conical wall of the retainer 60.

In the operation of the rotary mechanical seal disclosed in FIG. 1, the flexible spring steel ring 62 serves the function of both a spring for yieldingly urging the washer 36 forwardly against the seat 34, and of a bellows for sealing the washer to the walls of the recess 84. The slant angle of the frusto-conical ring 62 is sufficiently steep that the small base thereof will yield axially so that in the initial installation thereof the ring may be placed under axial compression. When the seal is in service, this axial compression maintains the proper pressure between the running seal faces 38 and 40 and also causes the washer 36 to move forwardly to compensate for wear. In the form of the invention shown in FIG. 1, the seat 34 is also yieldable under the influence of the O-ring 44 so that a portion of the wear on the seal faces is compensated for by rearward axial movement of the seat. However, as is the case in connection with the form of the invention shown in FIGS. 4 and 5, the flexibility of the ring 62 may be relied upon solely for wear compensation.

In the form of the invention shown in FIGS. 4 and 5, the rotary mechanical seal is shown for exemplary purposes as being installed in a caustic tank where an opening 100 in the wall 102 of the tank receives therethrough a rotary pump shaft 104. A noncorrosive lining 106 follows the inside contour of the wall. The opening 100 is surrounded by a cylindrical recess 108.

The seal of FIGS. 4 and 5 includes a seal seat 110 which rotates with the shaft 104 and may be fixedly secured to the shaft by a set screw 112. The seat may be of any suitable noncorrosive material, as, for example, a ceramic material, and it presents a rearwardly facing running seal face 114. The seal further includes a two-piece washer assembly 116, including a washer proper 118, and a flexible resilient ring 120. The washer assembly 116 is similar in many respects to the previously-described washer assembly 32, but in this latter form of the invention, the annular retainer 60 has been omitted and the interlocking driving connection between the washer 118 and ring 120 is of modified construction.

As best seen in FIG. 5, the central bore 122, which extends through the washer 118, is formed with a pair of diametrically disposed axial grooves 124. The small base of the frusto-conical ring 120 is turned forwardly to provide a short cylindrical section 126 which extends into the bore 122 with a tight pressed fit. A pair of tongues 128 are struck outwardly from the cylindrical section 126 and project into the respective grooves 124 to establish an interlocking driving connection between the ring and washer.

In the form of the invention shown in FIGS. 4 and 5, the slant angle of the frusto-conical ring 120 is somewhat steeper than the slant angle of the frusto-conical ring 62 in the previously-described form of the invention. The ring 120, therefore, offers a lesser degree of resistance to flexing, and thus, the resiliency and ability of the ring to yield to axial pressure is relied upon solely to compensate for wear of the operative running seal face 130.

In the operation of the form of the invention shown in FIGS. 4 and 5, the rim of the frusto-conical ring 120 at the large base of the cone frustum is pressed tightly into the recess 108 where it makes sealing engagement with the cylindrical and radial surfaces of the recess 108 so that liquid or fluid may not pass around the outside of the ring. The running seal faces 114 and 130 are maintained at the proper sealing pressure so that liquid may not pass across these faces radially in either direction.

The invention is not to be limited to the exact arrangement of parts shown in the accompanying drawings or described in this specification as various changes in the details of construction may be resorted to without departing from the spirit and scope of the invention. Therefore, only insofar as the invention has been particularly pointed out in the accompanying claims is the same to be limited.

Having thus described the invention what I claim as new and desire to secure by letters patent is:

1. In a rotary mechanical seal assembly for sealing an opening in a housing wall through which a rotatable shaft extends, an antifriction washer having a central opening therethrough adapted to surround the shaft and having a forward end face designed for running engagement with an annular radial surface normal to and turning with the shaft, a thin flexible imperforate frusto-conical backing ring for said washer, said backing ring being formed of spring steel and having its small base presented forwardly and bearing against the rear face of the washer for yieldingly urging the washer forwardly against the radial surface and having its large base designed for effective sealing engagement with a wall of the opening, the forward rim region of the small base of the frusto-conical backing ring being turned radially inwardly to provide a flat annular wall which bears against the rear face of the washer, the rear face of the washer being formed with a pair of diametrically disposed sockets therein, said flat annular wall being formed with a pair of diametrically disposed protuberances which extend into the sockets respectively and provide an interengaging driving connection between the ring and washer for preventing relative rotation therebetween, the radial width of said sockets being greater than the radial thickness of said protuberances whereby variations in the pressure exerted upon the backing ring by the washer and wall of the opening and tending to flatten the backing ring will cause said protuberances to shift their positions radially within said sockets.

2. In a rotary mechanical seal assembly, the combination set forth in claim 1 and wherein said protuberances are in the form of forwardly struck tongues which are displaced out of the plane of said flat annular wall.

References Cited by the Examiner
UNITED STATES PATENTS

| | | |
|---|---|---|
| 2,189,197 | 2/1940 | Cerny. |
| 2,267,994 | 12/1941 | Reynolds et al. _____ 277—65 |
| 2,279,669 | 4/1942 | Friskney. |
| 2,489,212 | 11/1949 | Zwack _____ 277—90 |
| 2,941,825 | 6/1960 | Heinrich. |

LAVERNE D. GEIGER, *Primary Examiner.*

MORRIS M. FRITZ, SAMUEL B. ROTHBERG, EDWARD V. BENHAM, *Examiners.*